(12) United States Patent
Dietrich et al.

(10) Patent No.: US 7,453,840 B1
(45) Date of Patent: *Nov. 18, 2008

(54) CONTAINMENT OF ROGUE SYSTEMS IN WIRELESS NETWORK ENVIRONMENTS

(75) Inventors: Paul F. Dietrich, Seattle, WA (US); David Anthony Frascone, Terrell, TX (US); Patrice R. Calhoun, Pleasanton, CA (US); Robert J. Friday, Los Gatos, CA (US); Robert B. O'Hara, Jr., Santa Clara, CA (US); Matthew Douglas Howard, Sunnyvale, CA (US)

(73) Assignee: Cisco Systems, Inc., San Jose, CA (US)

( * ) Notice: Subject to any disclaimer, the term of this patent is extended or adjusted under 35 U.S.C. 154(b) by 983 days.

This patent is subject to a terminal disclaimer.

(21) Appl. No.: 10/611,660

(22) Filed: Jun. 30, 2003

(51) Int. Cl.
*H04Q 7/00* (2006.01)
*H04L 12/28* (2006.01)
*H04L 12/56* (2006.01)
*H04L 9/32* (2006.01)
*G06F 7/04* (2006.01)
*G06F 17/30* (2006.01)

(52) U.S. Cl. .............................. 370/328; 370/401; 726/2

(58) Field of Classification Search ................. 370/328, 370/338, 401; 726/22–23, 2
See application file for complete search history.

(56) References Cited

U.S. PATENT DOCUMENTS

| | | | |
|---|---|---|---|
| 5,564,079 A | 10/1996 | Olsson | |
| 5,684,860 A | 11/1997 | Milani et al. | |
| 6,112,095 A | 8/2000 | Wax et al. | |
| 6,115,605 A | 9/2000 | Siccardo et al. | |
| 6,134,448 A | 10/2000 | Shoji et al. | |
| 6,140,964 A | 10/2000 | Sugiura et al. | |
| 6,198,935 B1 | 3/2001 | Saha et al. | |
| 6,212,391 B1 | 4/2001 | Saleh et al. | |
| 6,249,252 B1 | 6/2001 | Dupray | |
| 6,259,406 B1 | 7/2001 | Sugiura et al. | |
| 6,269,246 B1 | 7/2001 | Rao et al. | |

(Continued)

FOREIGN PATENT DOCUMENTS

EP     0 930 514 A2     7/1999

(Continued)

OTHER PUBLICATIONS

Chirumamilla, Mohan K. and Ramamurthy, Byrav, "Agent Based Intrusion Detection and Response System for Wireless LAN's" IEEE Int'l Conference on Communications, 2003, vol. 1, pp; 492-496.

(Continued)

*Primary Examiner*—Kevin C Harper
(74) *Attorney, Agent, or Firm*—Baker Botts L.L.P.

(57) ABSTRACT

Methods, apparatuses and systems facilitating containment of the effects of rogue or unauthorized access points on wireless computer network environments. Embodiments of the present invention support one to a plurality of rogue containment methodologies. A first rogue containment type involves identification of the physical connection of the rogue access point to the wired network infrastructure and, thus, allows for disabling of that physical connection to contain the rogue access point. Other rogue containment methods involve wireless techniques for containing the effect of rogue access points. As discussed below, the rogue containment functionality described herein can be applied to a wide variety of wireless network system architectures.

15 Claims, 6 Drawing Sheets

U.S. PATENT DOCUMENTS

| | | | |
|---|---|---|---|
| 6,275,190 | B1 | 8/2001 | Sugiura et al. |
| 6,282,427 | B1 | 8/2001 | Larsson et al. |
| 6,304,218 | B1 | 10/2001 | Sugiura et al. |
| 6,414,634 | B1 | 7/2002 | Tekinay |
| 6,415,155 | B1 | 7/2002 | Koshima et al. |
| 6,441,777 | B1 | 8/2002 | McDonald |
| 6,456,892 | B1 | 9/2002 | Dara-Abrams et al. |
| 6,526,283 | B1 | 2/2003 | Jang |
| 6,556,942 | B1 | 4/2003 | Smith |
| 6,760,318 | B1 | 7/2004 | Bims |
| 6,788,658 | B1 | 9/2004 | Bims |
| 6,925,070 | B2 | 8/2005 | Proctor, Jr. |
| 6,957,067 | B1 | 10/2005 | Iyer et al. |
| 7,002,943 | B2 | 2/2006 | Bhagwat et al. |
| 7,164,663 | B2 | 1/2007 | Frank et al. |
| 7,212,837 | B1 | 5/2007 | Calhoun et al. |
| 2002/0073231 | A1* | 6/2002 | Quarterman et al. ........ 709/238 |
| 2002/0174335 | A1 | 11/2002 | Zhang et al. |
| 2002/0188723 | A1 | 12/2002 | Choi |
| 2003/0023746 | A1 | 1/2003 | Loguinov |
| 2003/0054794 | A1 | 3/2003 | Zhang |
| 2003/0117985 | A1 | 6/2003 | Fijii et al. |
| 2003/0135762 | A1 | 7/2003 | Macaulay |
| 2003/0181215 | A1 | 9/2003 | Cromer et al. |
| 2003/0185006 | A1 | 10/2003 | Bard |
| 2003/0186679 | A1* | 10/2003 | Challener et al. ........... 455/410 |
| 2003/0198208 | A1 | 10/2003 | Koos, Jr. et al. |
| 2003/0219008 | A1 | 11/2003 | Hrastar |
| 2004/0003285 | A1* | 1/2004 | Whelan et al. .............. 713/201 |
| 2004/0008652 | A1 | 1/2004 | Tanzella et al. |
| 2004/0023639 | A1 | 2/2004 | Noel, Jr. |
| 2004/0023640 | A1 | 2/2004 | Ballai |
| 2004/0047324 | A1 | 3/2004 | Diener |
| 2004/0049699 | A1 | 3/2004 | Griffith et al. |
| 2004/0076134 | A1 | 4/2004 | Barber et al. |
| 2004/0176108 | A1 | 9/2004 | Misikangas |
| 2004/0198392 | A1 | 10/2004 | Harvey et al. |
| 2005/0021740 | A1* | 1/2005 | Bar et al. .................... 709/224 |
| 2005/0030929 | A1 | 2/2005 | Swier et al. |
| 2005/0073979 | A1 | 4/2005 | Barber et al. |
| 2005/1146959 | | 5/2005 | Challener et al. |
| 2005/0207381 | A1 | 9/2005 | Aljadeff et al. |
| 2005/0254474 | A1* | 11/2005 | Iyer et al. ................... 370/338 |
| 2007/0192870 | A1* | 8/2007 | Lynn et al. .................... 726/26 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |
| WO | WO 02/43425 A1 | 5/2002 |
| WO | WO 02/54813 A1 | 7/2002 |
| WO | WO 03/023443 A2 | 3/2003 |

OTHER PUBLICATIONS

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online URL: http://domino.research.ibm.com/comm/pr.nsf/pages/news.20020617_dwsa.html.

"Ekahau Logical Areas-location enabling the Wi-Fi-network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Apr. 4, 2003. Ekahau, Inc., Saratoga, CA. URL:http://www.ekahau.com/products/positioningengine/features.html.

"InFielder." Apr. 22, 2003. Wireless Valley, Austin TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic," Apr. 22, 2003. Wireless Valley, Austin, TX. URL: http://www.wirelessvalley.com/Products/Optimatic/Optimatic.asp.

"Predictor." Apr. 22, 2003. Wireless Valley, Austin, TX. URL: http://www.wirelessvalley.com/Products/Predictor/Predictor.asp.

"LANFielder Product Literature." Feb. 10, 2004. Wireless Valley, Austin, TX. URL:http://www.wirelessvalley.com/Assets/brochures/LanFielder.pdf.

Conley, C., "Securing WLANS with Location-Enabled Networks." Wireless Security Perspectives, vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL:www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Dectection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA, URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~butusu/papers/Bulusu00a.pdf.

"Assessing Wireless Security with AiroPeek and AiroPeek NX." A WildPackets Academy Tutorial from www.wildpackets.com, WildPackets Inc., Walnut Creek, CA. Jan. 16, 2003. URL: http://www.wildpackets.com/elements/whitepapers/AiroPeek_Security.pdf.

"AiroPeek and Wireless Security: Identifying and Locating Rogue Access Points." A WildPackets Academy Tutorial from www.wildpackets.com, WildPackets Inc., Walnut Creek, CA. Jan. 16, 2003. URL: http://www.wildpackets.com/elements/whitepapers/RogueAccessPoints.pdf.

Craiger, J.P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/88/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

International Standard, ISO/IEC 8802-11 ANSI/IEEE Std. 802.11, 1999 Edition, Part II: Wireless LAN Medium Access Control (MAC) and Physical Layer (PHY) specifications, pp. 122-137.

"Icp-masq" Internet citation http://speed.cis.nctu.edu.tw/bandwith/opensource/. Daa Sheet Cisco Aironet 1200 Series Access Point, pp. 1-13, posted Mar. 11, 2002.

* cited by examiner

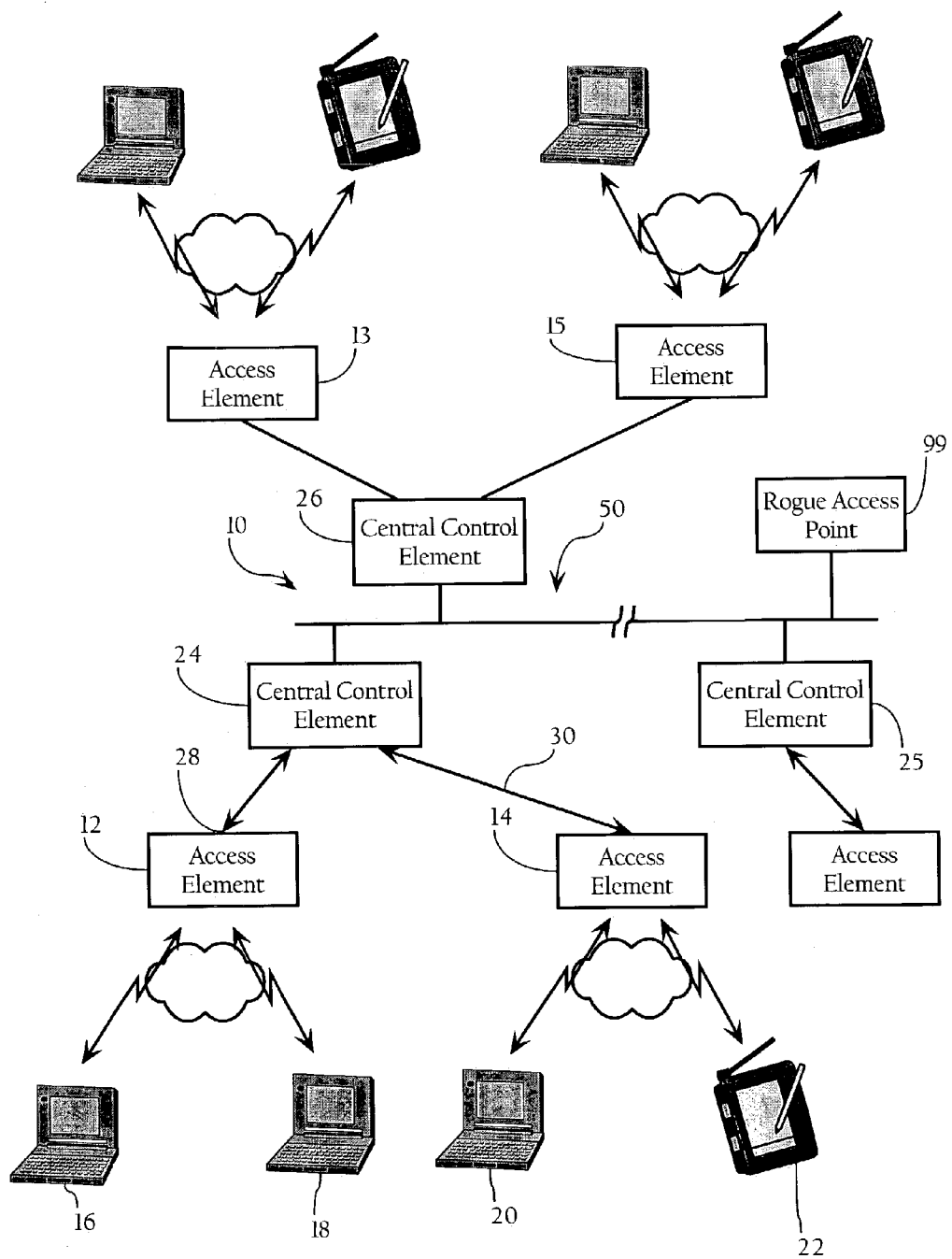
Fig._1

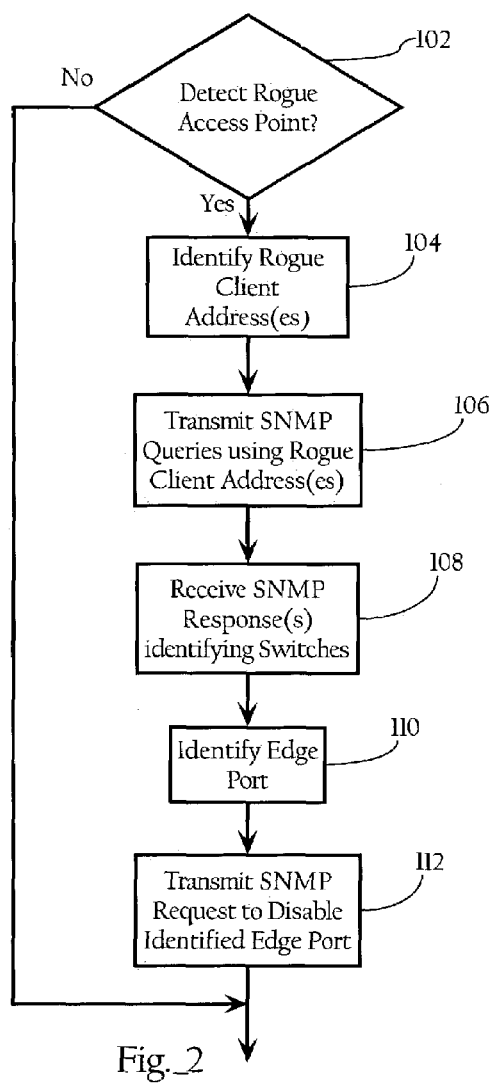
Fig._2
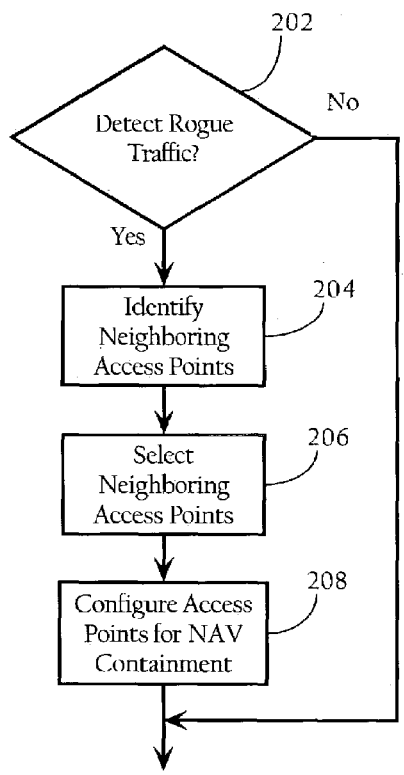
Fig._3

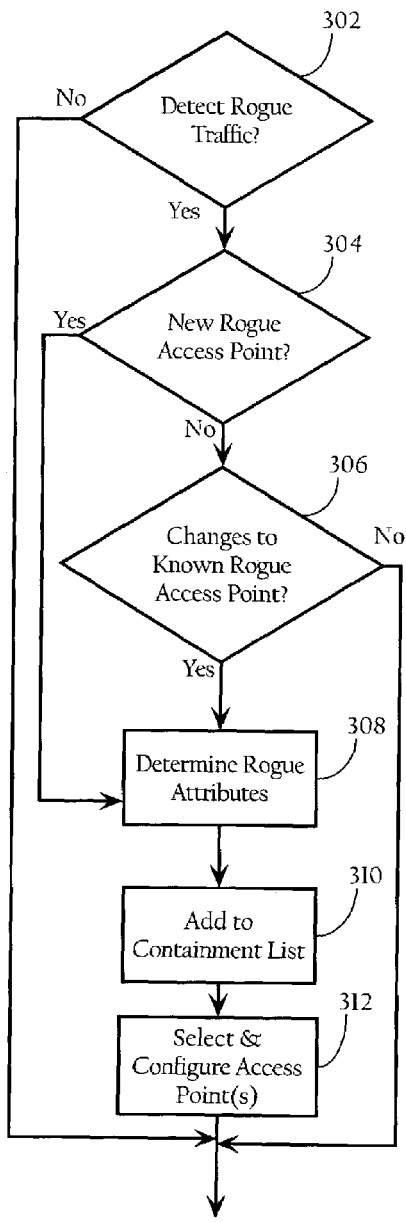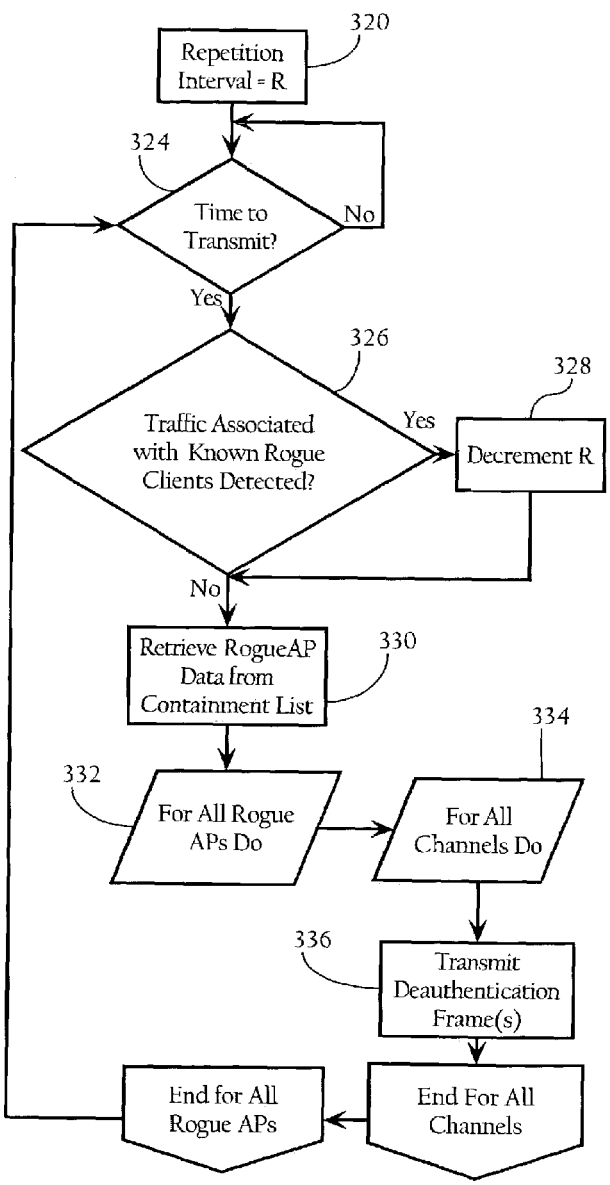
Fig._4A
Fig._4B

CONTAINMENT OF ROGUE SYSTEMS IN WIRELESS NETWORK ENVIRONMENTS

CROSS-REFERENCE TO RELATED APPLICATIONS

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN."

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;" and U.S. patent application Ser. No. 10/447,735 in the name of Robert B. O'Hara, Jr., Robert J. Friday, Patrice R. Calhoun, and Paul F. Dietrich, entitled "Wireless Network Infrastructure Including Wireless Discovery and Communication Mechanism."

FIELD OF THE INVENTION

The present invention relates to wireless computer networks and, more particularly, to methods, apparatuses and systems directed to the containment of rogue access points and clients in wireless network environments.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments becomes critical to performance and security. Indeed, wireless networks pose security risks not generally encountered in wired computer networks. For example, employees or malicious users may connect an unauthorized ("rogue") wireless access point to the corporate network, exposing the network to any wireless client in the coverage area of the access point, and possibly affecting the performance of the enterprises own wireless network infrastructure.

To detect rogue access points affecting a wireless network deployment, prior art processes, such as site surveys and periodic inspections, typically involve a human tester roaming throughout the wireless network environment with specialized equipment, such as a WLAN tester, that sweeps the wireless coverage area and stores the resulting data for analysis of one or more attributes of the wireless network deployment, such as the presence and identity of access points. Such site surveys and inspections, however, are time consuming and expensive. In addition, the analysis of the wireless network environment is performed with data gathered at a single point in time and, therefore, is not responsive to periodic or subsequent changes associated with the wireless network environment (such as installation of new rogue access points, etc.).

In addition, rogue access points may also affect the performance of a wireless network. In an Ethernet LAN (IEEE 802.3), the Carrier Sense Multiple Access with Collision Detection (CSMA/CD) protocol establishes how simultaneous transmissions (packet collisions) are handled. In a WLAN, collision detection in this manner is not possible due to what is known as the "near/far" problem: to detect a collision, a station must be able to transmit and listen at the same time. To account for this difference, the 802.11 protocol uses a slightly different protocol known as Carrier Sense Multiple Access with Collision Avoidance (CSMA/CA) or the Distributed Coordination Function (DCF). CSMA/CA attempts to avoid packet collisions by using explicit packet acknowledgement (ACK), which means that an ACK packet is sent by the receiving station to confirm that a packet arrived intact. CSMA/CA works by having the transmitting wireless station sense the air for wireless traffic. If there is no activity detected, the transmitting wireless station will wait an additional random period of time. If there still is no activity, the wireless station transmits the data. If the packet is received intact, the receiving station will send an ACK frame that, once received by the original sender, completes the transmission. If the ACK command is not received in a predetermined period of time, the data packet will be resent under the assumption that the original packet experienced a collision. CSMA/CA also handles other interference and radio-wave related problems effectively, but creates considerable overhead. Accordingly, the presence of rogue access points operating on overlapping channels within the vicinity of an authorized access affects the performance of the enterprise's wireless network.

Given the collision avoidance mechanisms employed in 802.11-compliant wireless networks, management and monitoring of the wireless network airspace (for example, to ensure that wireless access points do not interfere with one another) are critical to the performance of the wireless network environment. The administrative or management functionality associated with WLAN networks, however, generally lacks an integrated and/or automated means of detecting rogue access points. Hand-held scanners, AP startup scans, or full-time scanning devices are the current methods of obtaining data characterizing the network devices within a wireless network environment. Accordingly, many WLANs do not perform at optimum speed due to overlapping channel interference and rogue access points (i.e., access points installed without authorization and/or knowledge of a network administrator). To address the problems discussed above, U.S. patent application Ser. No. 10/155,938 discloses a wireless network system featuring integrated rogue access point detection, where access points or elements periodically go off-channel to scan their respective coverage areas for rogue access points.

While this system allows for identification of rogue access points, the system does not provide any mechanism to contain or disable the rogue access points once detected. After being notified of a rogue access point, the network administrator could attempt to physically locate it based on the known locations of the authorized access point(s) that detected the rogue access point, and then manually disable it. The enterprise or other network, however, is still vulnerable to the security issues discussed above, as well as performance degradation, until the network administrator has the time and ability to locate and disable the rogue access point. This time lag could prove critical if the rogue access point is employed by a malicious user.

In light of the foregoing, a need in the art exists for methods, apparatuses and systems that facilitate containment of rogue access points in wireless network environments. A need further exists in the art for methods directed to the containment of rogue access points that can be automatically implemented. A need further exists for methods of containing rogue access points that utilize the existing wireless network infrastructure. Embodiments of the present invention substantially fulfill these needs.

SUMMARY OF THE INVENTION

The present invention provides methods, apparatuses and systems facilitating containment of rogue or unauthorized access points on wireless computer network environments. Embodiments of the present invention support one to a plurality of rogue containment methodologies. A first rogue containment type involves identification of the physical connection of the rogue access point to the wired network infrastructure and, thus, allows for disabling of that physical connection to contain the rogue access point. Other rogue containment methods involve wireless techniques for containing the effect of rogue access points. As discussed below, the rogue containment functionality described herein can be applied to a wide variety of wireless network system architectures.

DESCRIPTION OF THE DRAWINGS

FIG. 1 is a functional block diagram illustrating a wireless network system according to an embodiment of the present invention.

FIG. 2 is a flow chart diagram providing a method directed to the containment of rogue access points.

FIG. 3 is a flow chart diagram showing a method, according to another embodiment of the present invention, directed to the containment of rogue access points.

FIGS. 4A and 4B are flow chart diagrams illustrating methods for containing rogue access points involving the targeting of wireless clients that associate with rogue access points.

DESCRIPTION OF PREFERRED EMBODIMENT(S)

Figure 5:
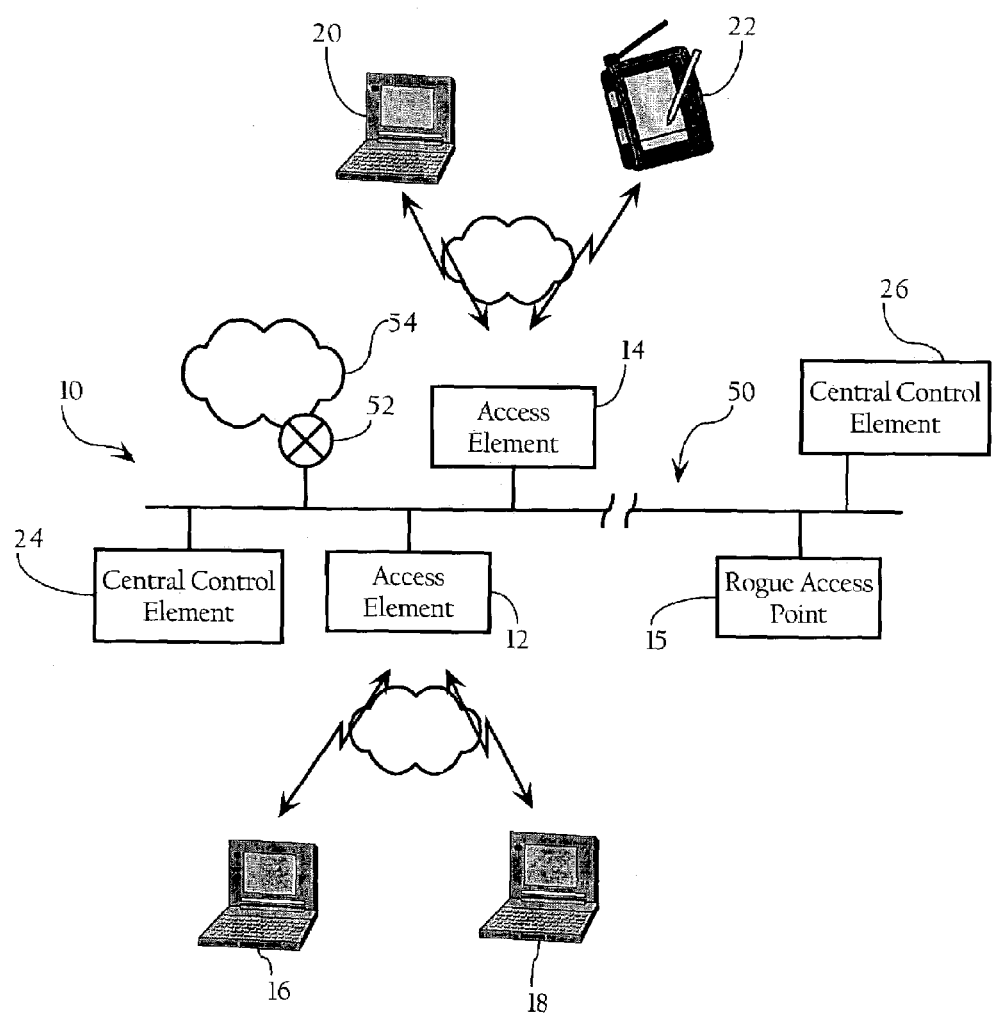
FIG. 5 is a functional block diagram illustrating an alternative wireless network system architecture in which the rogue containment functionality can operate.

The rogue containment functionality described herein assumes that one or more rogue access points have been detected. U.S. application Ser. No. 10/155,938, identified above, discloses methods, apparatuses and systems for detecting rogue access points over the airspace associated with a wireless network environment. However, the method according to which rogue access points are detected, as well as the devices and systems employed to detect them, are not critical to the rogue containment functionality of the present invention. Rogue access point detection may, as described in the above-identified application, be integrated into the wireless network environment and, therefore, automated. Alternatively, rogue access point detection may be executed in a more manual fashion, such as manually sweeping different coverage areas with a WLAN tester. However, as disclosed in U.S. application Ser. No. 10/155,938, the wireless network system can, in one embodiment, report detected rogue access points to a network administrator. The network administrator then has the option of placing the detected access point on an ignore list, or otherwise taking no action as to the rogue access point. Alternatively, the network administrator may initiate one or more rogue containment operations as described more fully below. In other embodiments, the rogue containment functionality may also be integrated into the wireless network system and may be automatically triggered upon detection of one or more rogue access points. The rogue containment functionality described herein may be physically integrated into the devices that implement a wireless network system, or may be embodied in dedicated, specialized network equipment. For example, the rogue containment functionality according to embodiments of the present invention may be embodied in a central rogue containment device 21 (see FIG. 6). In another embodiment, the rogue containment functionality may be embodied in one or more central control elements 24, 26 in a wireless network system featuring hierarchical processing of protocol information (see FIG. 1).

As discussed in more detail below, embodiments of the present invention support one to a plurality of rogue containment methodologies. A first rogue containment type involves identification of the physical connection of the rogue access point to the wired network infrastructure and, optionally, the disabling of that physical connection to contain the rogue access point. Other rogue containment methods involve wireless techniques for containing rogue access points.

A. Rogue Traffic Containment Using Wired Network Infrastructure

FIG. 2 illustrates the process flow, according to an embodiment of the present invention, directed to containing detected rogue access points using wired network or LAN-based functionality. For didactic purposes, the rogue containment functionality is integrated into a rogue containment device 21 in the wireless network system of FIG. 6. In one embodiment, rogue containment device 21 is a server or other computing platform configured to execute the rogue containment functionality described herein. In such an embodiment, the rogue containment device 21 includes a network interface allowing for communication of data between it and access elements 112, 114, and 116, as well as a rogue containment module operative to execute the functionality described herein. As discussed below, rogue containment device 21 operates in connection with one or more access points 112, 114, 116. However, rogue containment device 21 may operate with radio transmit/receive units dedicated to rogue containment and spaced throughout the wireless network environment.

As FIG. 2 illustrates, detection of a rogue access point, in one embodiment, triggers or initiates the process described herein (102). As to a detected rogue access point, rogue containment device 21 identifies the MAC address of at least one rogue wireless station that has associated with the detected rogue access point (104). U.S. application Ser. No. 10/155,938 discloses monitoring for packets on a given channel and recording information about the packets in a data structure. Upon detection of a rogue access point, certain information concerning the rogue access point is available, such as the wireless MAC address of the rogue access point. Other information may also potentially be available. For example, certain 802.11 frames, such as data frames, may also include the MAC address of a client wireless station. Certain 802.11 frames also include the Service Set Identifier (SSID) associated with the access point or element, such as beacon frames, probe responses and association requests, as well as its operating channel. If the initial scan for rogue access points yielded the MAC address for at least one wireless client associated with the rogue access point, then rogue containment device 21 can use this MAC address. However, if no wireless client MAC address is obtained from the initial rogue scan data, rogue containment device 21 can direct one or more access points (e.g., access points 114, 116) that originally detected the rogue access point to operate in a scan mode to identify data frames or other frames sourced from a wireless client and transmitted to the detected rogue access point. In one embodiment, the channels on which the scan is performed can be limited to the channel(s) detected in the initial scan or on a subset of channels centered around the channels advertised by the rogue access point (as in beacon frames), or the channels on which rogue traffic was originally detected by one or more access points. In another embodiment, the scan can be performed on all available frequency channels. One of ordinary skill in the art with knowledge of the wireless protocol employed will recognize how to obtain the requisite information. In 802.11 networks, the frames include a control field allowing for resolution of the frame type and the direction of the packet (e.g., from or to an access point).

With knowledge of one or more wireless client MAC addresses, rogue containment device 21 then transmits SNMP queries to the network devices implementing LAN 10 or WAN 50 (e.g., switches, hubs, bridges, etc.) to identify which network devices have encountered packets sourced from the wireless client(s). As discussed above, an access point typically bridges wireless traffic between wireless clients and the wired network to which the access point is connected. Pursuant to this bridging operation, the wireless 802.11 headers are stripped from the packets and replaced with the appropriate layer 2 protocol header, such as 802.3 (Ethernet). The source MAC address in the 802.3 header is the MAC address of the source wireless station. Still further, networking equipment, such as a LAN switch, maintains the source MAC addresses of packets encountered on a given port of the device in a management information base (MIB), which can be polled via SNMP queries. In one embodiment, rogue containment device 21 polls all devices with SNMP queries using one or more wireless station MAC addresses to identify the network device(s) that has (have) encountered a packet sourced from the identified rogue wireless client(s) (108). Rogue containment device 21 then polls the responding network device(s), again using SNMP queries, for the port of the network device that encountered the source wireless MAC address (110).

Figure 7:
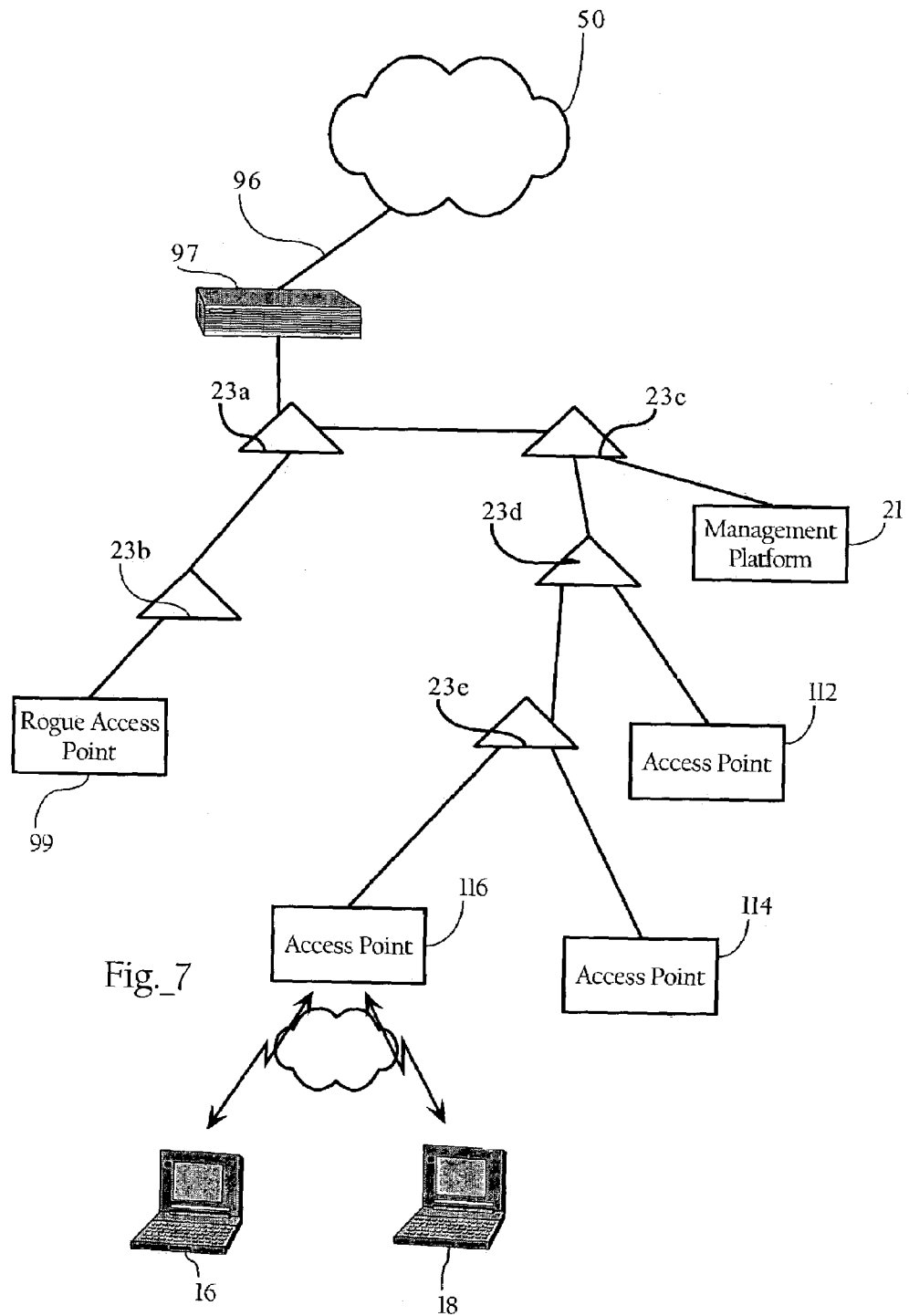
FIG. 7 is a functional block diagram providing another example wireless network system architecture in which the rogue containment functionality can operate.

In layered LAN topologies, such as a plurality of LAN switches arranged in a hierarchical configuration (see FIG. 7), more than one network device may respond. Specifically, FIG. 7 sets forth a network implemented by a plurality of LAN switches 23a, 23b, 23c, 23d and 23e. Packets sourced from a rogue wireless client and bridged by rogue access point 99 (destined for computer network 50 via router 97 and access link 96, for example) may be encountered by switches 23a and 23b. In these network configurations, rogue containment device 21 attempts to identify the network device to which the rogue access point 99 is directly connected. This allows only the port on switch 23b to which the rogue access point 99 is connected to be disabled without affecting other network traffic.

The IEEE 802.1d specification describes the spanning tree protocol and the methods according to which LAN switches keep track of or report MAC addresses encountered on each port. Using standard methodologies disclosed in the 802.1d specification, rogue containment device 21 can ascertain the LAN switch and port to which the rogue access point 99 is directly connected by querying, via SNMP, the 802.1d (spanning tree) tables maintained in the management information base (MIB) of the switches 23a-e implementing the network.

Rogue containment device 21 can report this information to a network administrator, via an email or other suitable message to allow the network administrator to manually configure the appropriate LAN switch (switch 23b in the example) or other network device to disable that port. Alternatively, the network administrator can physically disconnect the rogue access point 99 from the identified port. In the embodiment shown in FIG. 2, however, rogue containment device 21 can automatically transmit an SNMP query to the appropriate network device to disable the port to which the rogue access point is connected (112).

In one embodiment, the rogue containment device 21 (or other device containing the rogue containment functionality described herein) is configured with knowledge of the IP addresses of each LAN switch 23a-e or other network device, the SNMP read community name, and optionally the SNMP write community name (to allow rogue containment device to disable the port to which the rogue access point is connected).

B. Wireless Containment Functionality

As discussed above, wireless mechanisms and methods for containing rogue access points are also possible in addition to or in lieu of the wired network approach discussed above. In certain embodiments, the rogue containment functionality of the present invention takes advantage of the behavior of 802.11 wireless systems as it relates to the network allocation vector to contain rogue access points. In other embodiments, the rogue containment functionality targets the wireless stations that associate with the rogue access points and forces them to terminate their respective connections to the rogue access point.

B.1. Using Network Allocation Vector 802.11 wireless networks feature a virtual carrier-sense mechanism that facilitates the sharing of the wireless medium among a plurality of wireless stations. The virtual carrier-sense mechanism is achieved by distributing reservation information announcing the impending use of the medium by a given wireless station. The exchange of Request-to-Send (RTS) and Clear-to-Send (CTS) frames prior to transmission of the actual data frame is one means of distribution of this reservation information. The RTS and CTS frames contain a Duration/ID field that defines the period of time that the medium is to be reserved to transmit the actual data frame and the returning ACK frame. As to the duration value used, the wireless transmitter calculates a duration value corresponding to (based on) a set of rules defined by the 802.11 protocol. All wireless stations within the reception range of either the originating station (which transmits the RTS) or the destination station (which transmits the CTS) learn of the medium reservation. All wireless stations also use the Duration/ID field in data frames to identify the medium reservation as well.

The network allocation vector (NAV) is an indicator, maintained by each wireless station, of time periods when transmission onto the wireless medium will not be initiated by the station whether or not the station's clear channel assessment (CCA) function senses that the wireless medium is busy. All stations process Duration field values less than or equal to 32,767 from valid data frames to update their NAV settings as appropriate under the coordination rules defined in the 802.11 specification. The NAV is essentially a counter, which counts down to zero at a uniform rate. When the NAV counter is zero, the virtual carrier-sense indication is that the medium is idle; when nonzero, the indication is busy. As each station receives medium reservation information in the frames transmitted over the wireless medium, the NAV is reset and begins counting down.

An embodiment of the present invention takes advantage of the virtual carrier-sense mechanism to contain the effect of rogue access points. As FIG. 3 illustrates, when a rogue access point is detected (202), rogue detection device 21 identifies the authorized access points that neighbor the detected rogue access point (204). In one embodiment, this determination is made by assessing which access points detected frames transmitted to/from the rogue access point 99. In another embodiment, the determination may further be made based on location information of the authorized access points. After identification of neighboring access points, rogue detection device 21 selects one or more access points for rogue containment (206). Rogue containment device 21, in one embodiment, makes this selection based on the observed signal strength of frames sourced by the rogue access point 99. Rogue containment device 21 then configures the selected neighboring access point(s) to contain the rogue access point 99 (208).

In one embodiment, rogue containment exploiting the virtual carrier-sense mechanism is intended to disable all wireless traffic (authorized or unauthorized) in the approximate vicinity of the rogue access point 99. In such an embodiment, the selected access points are configured to transmit data frames intended to block wireless traffic on all available frequency channels. In one embodiment, the duration value in each frame is set to the maximum value allowed by the 802.11 or other applicable networking protocol. In one embodiment, the destination address of the data frame is set to a randomly-chosen or arbitrary value. The repetition interval for transmitting the data frames on each channel is less than the duration specified in the data frames. Accordingly, the maximum duration value need not be used as long as the repetition interval between data frames is less than the duration value. Since the virtual carrier-sense mechanism is not specific to a given Basis Service Set or BSSID, the repetition of data frames on all available channels causes all access points (authorized and rogue) that detect the data frames to reset their respective NAV counters, and continue to reset them before the counters approach zero, which would allow for transmission of frames. In this manner, all access points and wireless stations within range are effectively disabled during the time the selected access point(s) operate in this rogue containment mode.

In another embodiment, the rogue-containing data frames can be transmitted on selected channels to permit, if possible, authorized access points to operate within the vicinity of the rogue access point. In one embodiment, the access points that scan for rogue access points can also report the channels on which rogue traffic was detected. Channel information is also available from Beacon and Probe Response frames in 802.11 network environments. Rogue containment device 21 can use this channel information to select channels on which to transmit the rogue containing frames. For example, if a rogue access point is detected as operating on channel 5 in an 802.11b wireless network, rogue containment device 21 can configure one or more access points to transmit rogue containing frames on that channel or on a range of channels (e.g., 4 to 6) centered on channel 5. Use of selected channels, as opposed to all channels, requires additional monitoring in the event that the rogue access point changes its operating channel. In addition, rogue containment device 21 may also configure neighboring access points to operate on different, non-overlapping channels from the detected rogue access point(s), if possible. Use of selected channels also allows the access point(s) transmitting rogue containing frames to switch between a normal access point mode (serving authorized wireless stations) and a rogue containment mode (periodically going off channel to transmit rogue-containing data frames). In one embodiment, the transmission of rogue-containing frames, in addition to the timing considerations discussed above, is coordinated with the data link layer functionality of the access point. U.S. application Ser. No. 10/447,735 discloses coordinating transmission of frames with data link layer functionality to avoid interrupting the transmission of beacon frames. This method can be adapted to coordinate transmission of rogue containing frames with transmission of beacon frames.

B.2. Targeting Rogue Clients

As discussed above, the rogue containment functionality, according to an embodiment of the present invention, targets wireless clients that have authenticated and/or associated with rogue access points. In one embodiment, and as FIGS. 4A and 4B illustrate, detected rogue access points are added to a containment list. In one embodiment, a separate process spoofs the rogue access points and transmits de-authentication frames, causing the wireless stations that have associated with the rogue access point to terminate their connections.

In a specific embodiment, when wireless traffic from a rogue access point is detected (302), rogue containment device 21 determines whether the traffic corresponds to a new rogue access point (304). If so, rogue containment device determines the attributes of the rogue access point (e.g., MAC address, BSSID, transmission channel, etc.) (308) and adds the newly detected rogue access point to a containment list (310). The transmission channel can be determined, as discussed above, by examining certain frames, such as Beacon or Probe Response Frames, or by the channel on which rogue traffic was detected. In one embodiment, rogue containment device 21 stores the operating channel in association with the detected rogue access point on the containment list. In one embodiment, the containment list is implemented in a table or other data structure and includes the following fields: 1) MAC address (primary key), 2) BSSID, and operating channel. In one embodiment, the fields also contain the last N (e.g., 3) operating channels for each known rogue access point. In one embodiment, the containment list also includes identifiers corresponding to the authorized access points that detected the rogue access point during respective rogue AP scans. If the detected rogue traffic involves a known rogue access point (i.e., an access point previously detected during a scan), rogue containment device 21 re-determines the attributes of the rogue access point (308) and modifies the corresponding entry in the containment table (310). In one embodiment, if a new operating channel is detected, the last N channels field and the current channel field are updated accordingly. If the rogue access point has been physically moved to another location, this change can also be detected by comparing the access points that currently detect the rogue access point with the access points that previously detected the rogue. As FIG. 4A illustrates, rogue containment device 21 then selects and configures the access point(s) that will be used to target clients of the rogue access point (312). The selection can be based on the access points that detected the rogue access point, as well as other factors such as the signal strength detected by the access points, geographic proximity of other access points, operational load, and the like. In one embodiment, rogue containment device 21 configures the selected access points with a subset of the containment list including the rogue access points which the selected access points have been selected to contain.

In one embodiment, the selected authorized access points can be configured to periodically transmit de-authentication frames at fixed repetition intervals. The repetition interval, in one embodiment, is a heuristically determined value that is sufficient to prevent meaningful access to wireless clients of a detected rogue access point. In one embodiment, the repetition interval is a fixed value. However, in the embodiment described below, the repetition interval can be adjusted in response to detected wireless traffic associated with rogue clients. In one embodiment, the repetition interval is 100 ms; however, the repetition interval will depend on the particular wireless network environment and the time it takes for wireless clients to authenticate and associate with access points. The de-authentication frames are transmitted, in one embodiment, using the broadcast address as the destination address.

FIG. 4B illustrates a method, according to an embodiment of the present invention, executed by an access point that has been configured to target clients of a detected rogue access point. As discussed above, the access point spoofs the rogue access point (i.e., transmits frames using the MAC address and BSSID of the rogue access point), and periodically transmits de-authentication frames causing clients of the rogue access point to terminate their connections. As FIG. 4B shows, the repetition interval (R) is initially set to a first value, such as 100 milliseconds, (320) and decreased (328) if wireless traffic associated with the rogue clients are detected in subsequent scans, such as data frames, ACK frames, etc. transmitted from or to the wireless stations (326). Certain detected wireless traffic from the rogue access point itself, such as Beacon Frames, does not decrease the repetition interval, since Beacon Frames are periodically transmitted without regard to the state or activity of the clients. Similarly, other wireless frames sourced from clients, in one embodiment, would not decrease the repetition interval, such as authentication and association request frames.

As FIG. 4B illustrates, when it is time to transmit de-authentication frames (324), the access point retrieves the rogue access point data (MAC address and BSSID) (330). In one embodiment, for each rogue access point on the containment list (332), the access point transmits de-authentication frames on all available operating channels (334, 336). This process is repeated at every repetition interval. As discussed above, if wireless traffic from a wireless station that has associated with the rogue client is detected (either by that access point or by other access points during a rogue scan), the repetition interval is decreased (328).

Other variations are possible. For example, the analysis determining whether the repetition interval should be decreased can be performed centrally by the rogue containment device 21 and be applied on a per-access-point basis or, globally, to all access points. In such an embodiment, the rogue containment device 21 receives rogue scan data from access points as described in U.S. application Ser. No. 10/155,938 and analyzes the scan data to determine whether any wireless clients have gained access to the network through a known rogue access point. In addition, the channel information contained in Beacon or Probe Response frames or as detected during rogue scans, can be used to narrow the channels on which de-authentication frames are transmitted. In addition, the de-authentication frames may be transmitted on the last N observed channels for each rogue access point. In addition, rogue detection device 21 can respond in other ways to detecting wireless traffic associated with rogue clients, such as selecting additional or alternative neighboring access points to perform the rogue containment functionality described herein. In another embodiment, 802.11 disassociation frames can be transmitted in addition to, or in lieu of, de-authentication frames.

In yet another embodiment, rogue containment device 21 configures one or more access points to spoof a detected rogue access point and transmit beacon packets announcing a Contention-Free Period for an arbitrarily large time value, such as 200 milliseconds. As discussed above, to spoof the rogue access point, the selected access points use the MAC address and BSSID of the rogue access point as the source address in the beacon packets. As above, the beacon packets are transmitted at a repetition interval shorter than the announced contention-free period to essentially prevent wireless clients from accessing the rogue access points. In one embodiment, the transmission of these beacon packets can be coordinated with the transmission of regular beacon packets using the methods described in U.S. application Ser. No. 10/447,735.

C. Exemplary Operating Environments

Figure 6:
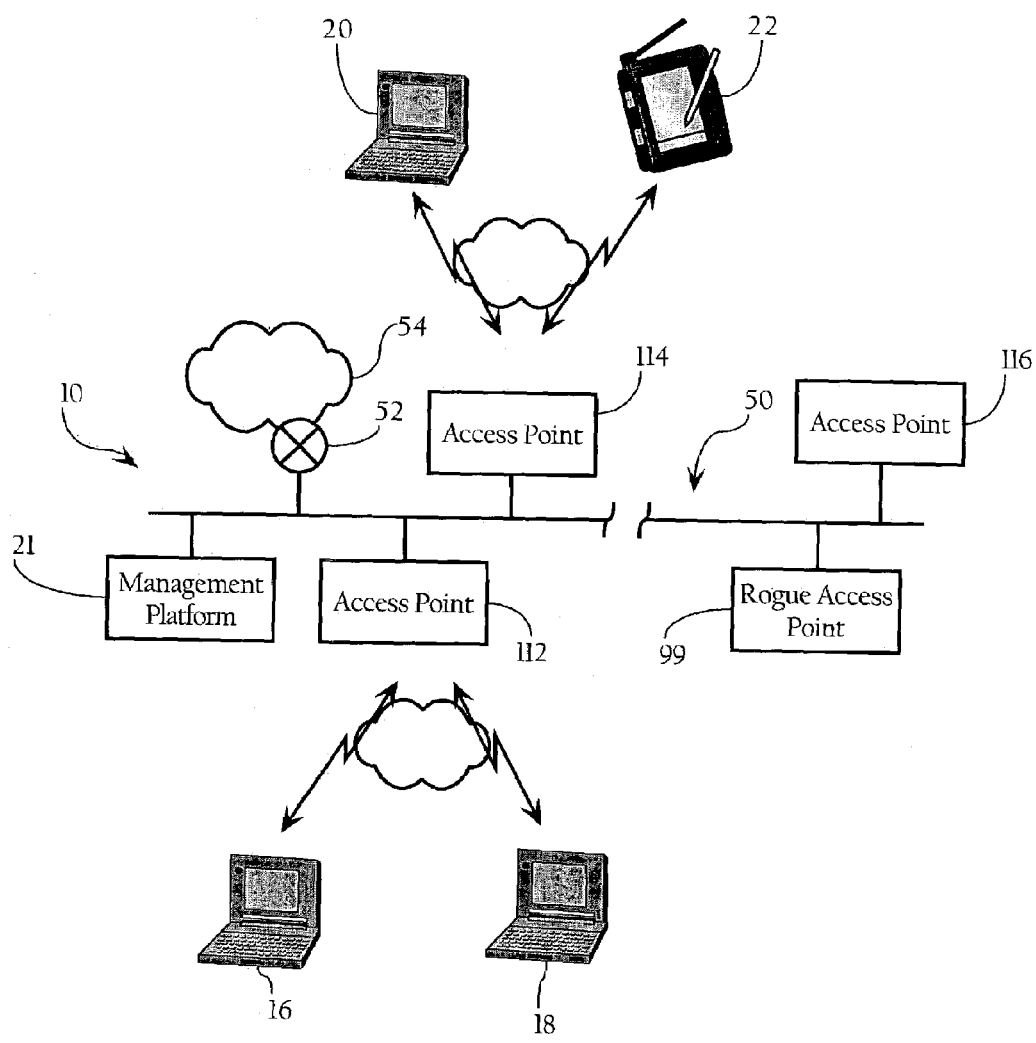
FIG. 6 is a functional block diagram providing yet another wireless network system architecture in which the rogue containment functionality can operate.

FIGS. 1, 5 and 6 illustrate exemplary wireless network systems into which the rogue containment functionality can be integrated. The rogue containment functionality described above was described, for didactic, purposes as operating in connection with the wireless network environment of FIG. 6. According to the embodiment of FIG. 6, access points 112, 114, and 116, in one embodiment, are configured to periodically scan for rogue access points and provide the data obtained during the scan to rogue containment device 21, which then applies one to all of the rogue containment mechanisms discussed above (such as configuring one or more access points 112, 114, 116 to transmit rogue-containing data frames).

As discussed below, however, the rogue containment functionality according to the present invention may be applied to other wireless network architectures. For example, the rogue containment functionality described herein may be integrated into a WLAN environment as disclosed in U.S. application Ser. Nos. 10/155,938 and 10/407,357 incorporated by reference herein. FIG. 1 illustrates a wireless computer network environment according to an embodiment of the present invention. Referring to FIG. 1, there is shown a block diagram of a wireless Local Area Network system 10 according to an embodiment of the invention. A specific embodiment of the invention includes the following elements: access elements 12, 14 for wireless communication with selected client remote elements 16, 18, 20, 22, central control elements 24, 25, 26, and means for communication between the access elements and the central control elements, typically direct line access 28, 30, but potentially a wireless backbone, fiber or other reliable link. As disclosed in U.S. patent application Ser. No. 10/407,357, in another embodiment, the access elements, such as access elements 12, 14 are directly connected to LAN 10 or a virtual local area network (VLAN) for communication with a corresponding central control element 24, 26. See FIG. 5.

The access elements 12-15 are coupled via communication means using a wireless local area network (WLAN) protocol (e.g., IEEE 802.11a or 802.11b, etc.) to the client remote elements 16, 18, 20, 22. The communications means 28, 30 between the access elements 12, 14 and the central control element 24 is typically an Ethernet network, but it could be anything else which is appropriate to the environment. As described in U.S. application Ser. No. 10/155,938, the access elements 12, 14 and the central control element 24 tunnel network traffic associated with corresponding remote client elements 16, 18; 20, 22 via direct access lines 28 and 30, respectively. Central control element 24 is also operative to bridge the network traffic between the remote client elements 16, 18; 20, 22 transmitted through the tunnel with corresponding access elements 12, 14.

In one embodiment, the access elements, such as access elements 12, 14, include functionality allowing for detection of the strength of the signal received from client remote elements and/or other access elements. For example, the IEEE 802.11 standard defines a mechanism by which RF energy is measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is typically an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. Again, many chip sets include functionality and corresponding APIs to allow for a determination of SNRs associated with packets received from client remote elements. In one embodiment, access elements 12, 14 include the detected signal strength and/or SNR value associated with a packet the encapsulating headers used to tunnel the wireless packets to central control element 24.

As described in the above-identified patent application, central control element 24 operates to perform data link layer management functions, such as authentication and association on behalf of access elements 12, 14. For example, the central control element 24 provides processing to dynamically configure a wireless Local Area Network of a system according to the invention while the access elements 12, 14 provide the acknowledgment of communications with the client remote elements 16, 18, 20, 22. The central control element 24 may for example process the wireless LAN management messages passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise. Central control elements 25, 26 and associated access elements 13, 15 operate in a similar or identical manner. Other system architectures are possible. For example, U.S. application Ser. No. 10/407,357 discloses a system architecture where the access elements, such as access elements 12-15, are directly connected to LAN segment 10.

As described in U.S. application Ser. No. 10/407,370, the access elements feature a scanning mode, according to which the access elements monitor their respective coverage areas for wireless traffic relative to at least one frequency channel and gather scan data characterizing detected wireless traffic. The scan data can be transmitted to a central management device, such as central management platform or a central control element 24 (FIG. 1 or 5) for processing and detection of rogue access points. In one embodiment, the access elements operate in a normal access point mode bridging wireless traffic between WAN 50 and the remote client elements. However, at a regular scanning interval, the access element switches to a scanning mode according to which it monitors its coverage area for wireless traffic for a scanning period.

In one embodiment, the functionality of rogue containment device 21 can be integrated into one or more central control elements 24, 26. In one embodiment, one of the central control elements 24, 26 is configured as a master central control element to centrally process rogue scan data and make the selection and configuration decisions associated with the rogue containment functionality discussed above for the entire wireless network system. In another embodiment, each central control element 24, 26 can operate in an independent or autonomous manner with respect to the access elements under its respective control.

The invention has been explained with reference to specific embodiments. Other embodiments will be evident to those of ordinary skill in the art. For example, the present invention can also be applied to WLAN architectures employing other wireless protocols beyond the IEEE 802.11 standard. It is, therefore, intended that the claims set forth below not be limited to the embodiments described above.

What is claimed is:

1. In a wireless network environment comprising at least one authorized access point, a method for containing rogue access points, the rogue access points including a virtual carrier-sense mechanism operative to adjust a counter in response to wireless frames transmitted from wireless stations, wherein the data frames include a duration value, the counter controlling the transmission of frames by the rogue access point, comprising
   detecting a rogue access point,
   identifying at least one authorized access point that neighbors the rogue access point;
   selecting at least one authorized access point in the identifying step;
   configuring the at least one selected access point to periodically transmit wireless frames, the data frames including a predetermined duration value, and wherein the interval at which the data frames are periodically transmitted is less than the duration value.

2. The method of claim 1 wherein the wireless frames are transmitted on all available frequency channels.

3. The method of claim 1 further comprising
   identifying the channel on which the rogue access point is transmitting; and wherein the wireless frames are transmitted on the identified channel.

4. The method of claim 1 further comprising
   identifying the channel on which the rogue access point is transmitting; and wherein the wireless frames are transmitted on a range of channels centered on the identified channel.

5. In a wireless network environment implementing a protocol according to which wireless stations terminate connections with access points upon receipt of de-authentication and/or disassociation frames, a method for containing rogue access points, comprising detecting a rogue access point, the rogue access point identified by a wireless network address;

selecting at least one authorized access point;

emulating the rogue access point and periodically broadcasting, at repetition interval, beacon frames, wherein the beacon frames announce a contention-free period, and wherein the contention-free period is greater than the repetition interval.

6. A wireless network system enabling a directed association mechanism, comprising a plurality of access elements for wireless communication with at least one remote client element and for communication with a central control element;

a central control element for supervising at least one of said access elements, wherein the central control element is operative to manage and control the wireless connections between the access elements and corresponding remote client elements; and wherein the access elements are each operative to:

establish and maintain, in an access point mode, wireless connections with remote client elements;

switch to a scanning mode for a scanning period at a scanning interval to detect wireless traffic, record scan data characterizing the detected wireless traffic, and transmit the scan data to the central control element;

wherein the central control element is operative to process the scan data against information relating to known access elements to identify rogue access points, to contain the detected rogue access point(s); and wherein the central control element is operative to establish a tunnel with access elements for transmission of wireless traffic associated with corresponding remote client elements, and bridge network traffic between a computer network and a remote client element through a tunnel with a corresponding access element.

7. The system of claim 6 wherein the computer network comprises at least one network device operative to switch or route data units between devices connected thereto, the data units including a source address and a destination address, wherein the at least one network device comprises at least two ports to which other devices connect, and wherein the at least one network device is operative to store the source addresses of the data units encountered at the ports of the at least one network device, and wherein the central control element is operative to determine the address of at least one rogue client associated with the rogue access point; and identify the port to which the rogue access point is connected by querying, using the addresses of the at least one rogue client, the at least one network device for the port at which data units sourced from the at least one rogue client were encountered.

8. The system of claim 7 wherein the central control element is operative to report the identified port to a network administrator.

9. The system of claim 7 wherein the central control element is operative to disable the identified port.

10. The system of claim 6 wherein the central control element is operative to configure one or more access elements to contain the detected rogue access point(s).

11. The system of claim 10 wherein the central control element is operative to configure one or more of the access elements to emulate the rogue access point and transmit connections terminating frames.

12. The system of claim 11 wherein the connection terminating frames are de-authentication frames.

13. The system of claim 11 wherein the connection terminating frames are disassociation frames.

14. The system of claim 11 wherein the connection terminating frames are transmitted at a fixed repetition interval.

15. The system of claim 11 wherein the connection-terminating frames are transmitted as a repetition interval, and wherein the repetition interval is adjusted in response to detection of wireless traffic transmitted between the rogue access point and a wireless client.

* * * * *